United States Patent Office 2,775,524
Patented Dec. 25, 1956

2,775,524
METHOD OF PRODUCING CELLULATED ARTICLES

Dominic D'Eustachio, Port Allegany, Pa., assignor to Pittsburgh Corning Corporation, Pittsburgh, Pa., a corporation No Drawing. Application March 21, 1952,
Serial No. 277,895

1 Claim. (Cl. 106—40)

The present invention relates to a process of preparing cellular glass and it has particular relation to the preparation of a cellular glass by the incorporation of suitable gassing agents in pulverulent form with powdered glass and heating the resultant mixture to sinter it and to generate bubbles of gas therein.

It has heretofore been proposed to prepare a material suitable for use as a heat insulator and for floats in life rafts and similar purposes by finely crushing glass cullet containing sulfates and/or certain metal oxides such as antimony oxide, admixing the ground glass with a carbon black, powdered coal, or other carbonaceous material and then heating the mixture to a temperature sufficient to sinter and cellulate the glass. The sintering temperature is the temperature at which the glass particles become soft and adhere together by contact.

As a result of the heating operation, a chemical reaction takes place at the temperature approximating or slightly above the temperature of the sintering of the glass, between the carbon and the sulfates and/or metal oxides in the glass. Gases such as sulfur dioxide, carbon dioxide, and other gases are generated in situ in the sintered mass and are entrapped as bubbles which impart to the mass a cellular structure and result in a product of light weight and high resistance to the transmission of heat by conduction and radiation. The cell structures are in most cases sealed so that water, liquid, or vapor and chemical fumes can not permeate the mass.

The material as heretofore obtained, was black in color due to the presence of free carbon in the sintered mass. The presence of these entrapped particles of carbon is believed to reduce the thickness of the cell walls and thus facilitate to a small degree the penetration of moisture through the cellulated glass at high temperatures.

It was thought that the presence of the carbon in the cellulated glass could be eliminated by merely reducing the amount of the carbon used in the cellulating batch so that all the carbon would be oxidized to a gas and none would remain as carbon. However, it was found that the reduction of the amount of carbon below a critical point seriously reduced the amount of cellulation and that carbon still remained in the cellulated product when employed in amounts slightly below this critical point. This minimum amount of carbon varies with the type of glass to be cellulated and with the gassing agents employed. In the case of cellulating a ground lime-soda glass containing antimony oxide, the minimum amount of carbon which can be employed to give good cellulation is about 0.2 percent by weight of the ground batch.

The explanation of the requirement of such a minimum amount of carbon to achieve good cellulation appears to be that one clump of carbon particles is needed for each cell formed to act as a nucleus for starting the formation of the cell. Thus it can be seen that it is necessary to provide as uniform and as high a degree of mixing of the carbon and ground glass as possible to achieve good uniform cellulation.

The best means known at the present for achieving such intimate mixture is to grind the glass and carbon together in a ball mill. The carbon clumps present in such resulting mixture are larger than they need be, but further subdivision is extremely difficult because the large number of relatively fine glass particles cushion the blows of the balls and cut grinding efficiency and mixing to a very low figure after a certain mesh size is reached.

In accordance with the present invention a more efficient method of utilizing carbon in the above described process for making cellular glass has been discovered. This method comprises employing carbon or carbonaceous material prepared as a coating on an inert substance having a high surface area for a given weight, for example having a surface area above 10 square meters per gram of inert substance and preferably above 50 square meters per gram of inert substance. Such high surface area substances are inert with respect to the glass and gassing agents and include diatomaceous earth and specially prepared substances having a high surface area such as specially prepared silicas and calcium silicates.

The carbon may be prepared by absorbing on the diatomaceous earth or silica a solution of sugar or other carbon-containing substance which substance will readily decompose to carbon upon heating or treating with a reducing agent. The carbon also may be prepared by mixing a slurry of finely divided carbon with the high surface area inert substance such as diatomaceous earth to insert the carbon particle in the skeleton like structure of the diatomaceous earth and then drying the mixture. Other carbon containing compounds which may be used include glycerol or other polyhydric alcohols. The weight ratio of carbon to inert substance may vary from 5 to 50 parts carbon in 100 parts inert substance.

A sufficient quantity, for example from 0.2 to 0.8 percent by weight of this prepared diatomaceous earth or silica is added to the ground glass, mixed and pulverized in a ball mill and then heated to a temperature sufficient to sinter and cellulate the glass as described above to produce the cellulated glass. Temperatures of from 1400 to 1800° F. are suitable in most instances. A high degree of cellulation is obtained by this process and less than one-half the amount of carbon previously required is used. Cellulated products thus produced are more resistant to moisture penetration than cellulated products produced according to presently known methods.

The silica skeleton of the diatomaceous earth keeps the carbon particles separated from each other. The use of such carbon-containing silica provides a greater volume of material for grinding with less carbon and enables a more efficient distribution of the carbon to be attained. The presence of the diatomaceous earth or silica in the product is not harmful.

The following examples are illustrative of the invention:

Example I

Silica containing carbon was prepared in the following manner. Ten grams of a silica having a surface area of approximately 100 square meters per gram were mixed with 20 grams of sugar and 10 grams of water, stirred to a uniform paste, evaporated to dryness, and then heated with a limited supply of air to 300° C. for 2 hours to form a black char.

The resulting black char was mixed with glass cullet in four different batches using 0.2, 0.4, 0.8 and 1.6 grams of char to 100 grams of glass. The glass was typical lime soda glass containing about 1.0 percent of antimony oxide.

These mixtures were each ground for about five hours in a ball mill maintained at a temperature of 80° F. Thereafter the mixtures were placed in a crucible which was then covered and the mixture was heated to a temperature of about 1600° F. for 30 minutes and cellulated glass was obtained. The sample in which only 0.2 gram

*Example II*

Mixtures of equal parts of sugar and a silica having a surface area of approximately 100 square meters per gram were prepared in an aqueous solution and a char was produced as in Example I. Various amounts of this char were mixed with ground glass and cellulated as in Example I. In all cases good cellulation was obtained when 0.08 to 0.15 percent by weight of carbon was present. With the lower values of carbon, a light colored cellulated glass was obtained.

*Example III*

Example II was repeated using a black char made from a solution containing 40 grams of sugar to 10 grams of silica. Similar results were obtained.

*Example IV*

Mixtures of a silica having a surface area of approximately 100 square meters per gram and a commercial aqueous suspension of carbon black in which the carbon has a particle size of about 12 millimicrons were prepared containing 6, 12, 25, and 50 percent carbon by weight of the mixture of carbon and silica. The mixtures were heated at 120° C. for one hour to evaporate the water. Portions of these mixtures were added to ground glass as in Example I, ground for five hours in a ball mill, and then heated to a temperature of 1630° F. to cellulate the mixture. Two tests were run for each percentage of carbon as prepared above. The amounts of the mixture added to the glass for each percentage was 0.6 and 0.8 percent by weight of the mixture of the glass and prepared carbon.

*Example V*

Example I was repeated employing diatomaceous earth in place of the silica and good cellulation was obtained.

*Example VI*

Example I was repeated employing a ground lime soda glass and 1.0 percent of pulverulent antimony oxide in place of the ground glass of Example I containing the antimony oxide. Good cellular glass was obtained.

The invention is applicable wherever carbon is to be used as the gassing agent in the cellulation of vitreous material such as glass or other materials which may be cellulated such as slag, silica, glass batch materials, natural mineral silicates, etc. For example, the invention is applicable when carbon is used as the gassing agent by itself to produce cellulation by reaction with the glass or with other gassing agents to produce cellulation by reaction of the carbon with the other gassing agents such as the sulfates and oxides of many metals including the sulfates disclosed in U. S. Patent No. 2,514,324 and the oxides of various metals such as cadmium, arsenic, zinc, lead, iron, titanium, aluminum, molybdenum, vanadium, tungsten, etc.

Although the present invention has been described with particular reference to the specific details of certain embodiments thereof, it is not intended that such details shall be regarded as limitations upon the scope of the invention except insofar as included in the accompanying claim.

What is claimed is:

A method of preparing cellular glass, which comprises absorbing on inert material selected from the group consisting of diatomaceous earth and silica and having a surface area greater than about 10 square meters per gram, a substance selected from the group consisting of polyhydric alcohols and an aqueous sugar solution, heating said inert material with said absorbed substance thereon to decompose said substance and form a black char containing carbon in an amount from 5 to 50 parts by weight to 100 parts of said inert material, grinding a mixture of glass cullet with an amount of said char to provide from 0.08 to 0.15% by weight of carbon based on the weight of said cullet, heating the ground mixture to a temperature sufficient to soften and cellulate the glass and cooling the product.

References Cited in the file of this patent

UNITED STATES PATENTS

| | | |
|---|---|---|
| 2,123,536 | Long | July 12, 1938 |
| 2,343,908 | Kinzie et al. | Mar. 14, 1944 |

FOREIGN PATENTS

| | | |
|---|---|---|
| 623,807 | Great Britain | May 24, 1949 |
| 457,274 | Canada | June 7, 1949 |